(12) United States Patent
Fuchs

(10) Patent No.: US 10,323,566 B2
(45) Date of Patent: Jun. 18, 2019

(54) INTERNAL COMBUSTION ENGINE

(71) Applicant: INNIO Jenbacher GmbH & Co OG, Jenbach (AT)

(72) Inventor: Jochen August Fuchs, Jenbach (AT)

(73) Assignee: INNIO Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 15/576,195

(22) PCT Filed: May 4, 2016

(86) PCT No.: PCT/AT2016/050124
§ 371 (c)(1),
(2) Date: Nov. 21, 2017

(87) PCT Pub. No.: WO2016/187628
PCT Pub. Date: Dec. 1, 2016

(65) Prior Publication Data
US 2018/0135505 A1 May 17, 2018

(30) Foreign Application Priority Data

May 26, 2015 (AT) ...................................... 328/2015

(51) Int. Cl.
*F02B 19/12* (2006.01)
*F02B 19/10* (2006.01)
(Continued)

(52) U.S. Cl.
CPC ........ *F02B 19/1014* (2013.01); *F02B 19/108* (2013.01); *F02B 19/1009* (2013.01);
(Continued)

(58) Field of Classification Search
CPC .. F02B 19/1014; F02B 19/1009; F02B 19/12; F02B 19/02; F02B 19/108; F02F 3/28; F02M 35/10144
(Continued)

(56) References Cited

U.S. PATENT DOCUMENTS 3,982,513 A * 9/1976 Nakagawa ........... F02M 13/046
123/274
4,112,878 A 9/1978 Heitland et al.
(Continued)

FOREIGN PATENT DOCUMENTS

DE          25 27 406 A1      12/1976
DE           2544762 A1 *      4/1977  .............. F02B 19/12
(Continued)

OTHER PUBLICATIONS

Office Action and Search issued in connection with corresponding AT Application No. A328/2015 dated Nov. 6, 2015.
(Continued)

*Primary Examiner* — Mahmoud Gimie
(74) *Attorney, Agent, or Firm* — Fletcher Yoder, P.C.

(57) ABSTRACT

An internal combustion engine with a cylinder head and at least one piston-cylinder unit, in which, in a cylinder, a piston can be moved between a bottom and a top dead center position, where, in the cylinder, between the piston and the cylinder head a main combustion chamber is formed, which communicates with a prechamber which has a prechamber gas valve, and where the intake and outlet valves of the main combustion chamber are actuated by an actuator, where the prechamber gas valve is connected to a source for a gas-air mixture and the prechamber charge consists of a gas-air mixture with a lambda higher than 1.2, preferably higher than 1.5 and particularly preferably higher than 1.7, and the actuator is configured such that the intake valve closes
(Continued)

before the piston reaches the bottom dead center position, where the piston is designed as a flat piston.

10 Claims, 2 Drawing Sheets

(51) Int. Cl.
*F02D 19/02* (2006.01)
*F02D 19/06* (2006.01)
*F02D 41/00* (2006.01)
*F02F 3/28* (2006.01)
*F02M 35/10* (2006.01)
*F02B 63/04* (2006.01)

(52) U.S. Cl.
CPC .............. *F02B 19/12* (2013.01); *F02D 19/02* (2013.01); *F02D 19/0642* (2013.01); *F02D 41/0025* (2013.01); *F02D 41/0027* (2013.01); *F02F 3/28* (2013.01); *F02M 35/10144* (2013.01); *F02B 63/04* (2013.01); *F02B 2275/32* (2013.01); *Y02T 10/125* (2013.01); *Y02T 10/142* (2013.01); *Y02T 10/32* (2013.01); *Y02T 10/36* (2013.01)

(58) Field of Classification Search
USPC .................... 123/254, 274, 276–278, 260
See application file for complete search history.

(56) References Cited

U.S. PATENT DOCUMENTS

| | | | |
|---|---|---|---|
| 4,119,066 A | 10/1978 | Happel | |
| 4,127,095 A | 11/1978 | Noguchi et al. | |
| 4,258,681 A * | 3/1981 | Gruden ................. | F02B 19/108 123/277 |
| 4,259,932 A | 4/1981 | Hideg et al. | |
| 4,306,526 A | 12/1981 | Schaub et al. | |
| 4,638,777 A | 1/1987 | Fanner et al. | |
| 4,768,481 A * | 9/1988 | Wood ....................... | F02B 1/12 123/254 |
| 5,050,550 A | 9/1991 | Gao | |
| 5,070,833 A | 12/1991 | Matsuoka | |
| 5,080,060 A | 1/1992 | Huang et al. | |
| 5,555,868 A | 9/1996 | Neumann | |
| 5,887,566 A | 3/1999 | Glauber et al. | |
| 6,095,112 A | 8/2000 | Glauber et al. | |
| 6,907,859 B1 | 6/2005 | Robinson | |
| 7,659,655 B2 | 2/2010 | Tozzi et al. | |
| 2013/0054124 A1* | 2/2013 | Stoll ....................... | F02D 41/22 701/112 |
| 2013/0055985 A1 | 3/2013 | Gruber et al. | |
| 2016/0010538 A1* | 1/2016 | Suzuki ................ | F02B 19/1085 123/292 |

FOREIGN PATENT DOCUMENTS

| | | |
|---|---|---|
| DE | 44 19 429 A1 | 12/1995 |
| DE | 10 2004 016 260 B4 | 2/2009 |
| DE | 10 2007 060 560 A1 | 6/2009 |
| EP | 0 377 265 A1 | 7/1990 |
| EP | 0 906 500 B1 | 9/2000 |
| EP | 2 558 696 A1 | 2/2013 |
| FR | 2 893 673 A1 | 5/2007 |
| JP | H0-8121256 A | 5/1996 |
| JP | H09-158729 A | 6/1997 |
| JP | H10-47096 A | 2/1998 |
| JP | H10-47165 A | 2/1998 |
| JP | H10-153145 A | 6/1998 |
| JP | 2000-320369 A | 11/2000 |
| JP | 2003-278548 A | 10/2003 |
| JP | 2009-221937 A | 10/2009 |
| JP | 2009-299592 A | 12/2009 |
| WO | 03/008777 A1 | 1/2003 |
| WO | 2008/081083 A1 | 7/2008 |
| WO | 2008/106722 A1 | 9/2008 |
| WO | 2011/127494 A1 | 10/2011 |

OTHER PUBLICATIONS

Machine Translation and International Search Report and Written Opinion issued in connection with corresponding PCT Application No. PCT/AT2016/050124 dated Aug. 17, 2016.
Machine Translation and International Preliminary Report on Patentability issued in connection with corresponding PCT Application No. PCT/AT2016/050124 dated Nov. 28, 2017.

* cited by examiner

INTERNAL COMBUSTION ENGINE

BACKGROUND OF THE INVENTION

This invention relates to an internal combustion engine and a method.

It is known that internal combustion engines, in particular gas engines, can be designed as direct ignitors with a displacement volume of up to approximately 3 liters. In the case of direct ignitors, a spark plug protruding into the main combustion chamber directly ignites the gas/air mixture present in the main combustion chamber. The disadvantage of direct ignitors is that the quality of the ignition of the gas-air mixture depends entirely on the spark plug. Even minimal wear and tear of the spark plug becomes noticeable due to cycle fluctuations (fluctuations in the center of gravity of the combustion). However, to operate at maximum efficiency, it is important to operate the internal combustion engine as close as possible to the knocking limit. Despite this, if cycle fluctuations must be considered, the internal combustion engine must be operated further away from the knocking limit and thus at reduced efficiency. In such internal combustion engines, which have no prechambers, it is customary, by using specially designed spark plugs, pistons (e.g. recessed pistons) and a special cylinder head, and by closing the intake valve after the piston has left its bottom dead center (late Miller or Atkinson cycle), to achieve swirling of the charge in the main combustion chamber and thus a more homogeneous combustion.

It is also known that by flushing the prechambers with pure gas or a very rich gas-air mixture (lambda approximately equal to 1.1) in the case of internal combustion engines equipped with prechambers (generally with a displacement volume of approximately 3 liters), the mixture in the prechamber can be made to be readily flammable. At the time of ignition, a lambda of around 1.0 to 1.1 occurs in the prechamber. This is referred to as gas-flushed prechambers. The ratio of the volume of the prechamber to the volume of the main combustion chamber in the top dead center (compression volume) is frequently around 1% for such prechamber engines.

Gas-flushed prechambers generally have a fuel-gas supply which is separate from the supply of the main combustion chambers. This fuel-gas supply generally comprises a prechamber gas compressor which serves to bring the fuel gas intended for the prechamber to the level of the charge-air pressure or higher to generate a positive pressure gradient across the prechamber gas valve (generally a non-return valve). The costs for the prechamber gas compressor and the prechamber gas control path are considerable, meaning that this technology is not used for smaller gas engines (with a stroke volume of up to approx. 3 liters).

It is also known that an intake valve can be closed before a piston has reached its bottom dead center in the intake stroke (early Miller cycle).

BRIEF DESCRIPTION OF THE INVENTION

An object of an embodiment of the invention is to provide a generic internal combustion engine and a generic method by which a homogeneous and very rapid combustion can be achieved without a specially designed spark plug, piston and cylinder head.

According to an embodiment of the invention, it is thus provided that the prechamber gas valve is connected to a source for a gas-air mixture, and the prechamber charge is composed of a gas-air mixture with a lambda higher than 1.2, higher than 1.5, particularly 1.7, and the actuator is configured such that the intake valve closes before the piston reaches the bottom dead center position.

Example actuators for the intake and outlet valves are a camshaft or hydraulic devices. This means the bottom dead center in the intake stroke.

A stoichiometric ratio of gas to air gives a lambda of 1. An excess of air (lean mixture) gives a lambda higher than 1. "Gas" in the gas-air mixture means a fuel gas, e.g. natural gas.

Normally, the charge in the prechamber has a stoichiometric lambda or at most a slightly increased lambda, since this charge serves to generate an intense ignition pulse. The ignited charge of the prechamber enters the main combustion chamber in the form of ignition torches via overflow holes and ignites the lean gas-air mixture present there.

An embodiment of the invention uses the counter-intuitive measure of charging the prechamber with a very lean gas-air mixture (lambda higher than 1.2, higher than 1.5, particularly higher than 1.7) and combining this measure with an early Miller cycle (or Atkinson cycle).

Surprisingly, the prechamber can be thus used in a manner which, due to the torches entering the main combustion chamber, causes homogenization of the combustion of the mixture in the main combustion chamber which, in the prior art of direct ignitors, is only possible by means of the complicated construction measures described above. The early Miller cycle ensures the complete flushing of the prechamber through the still retracting piston.

Thus, for example, specially designed pistons such as recessed pistons can be avoided, and flat pistons can be used instead, according to an embodiment of the invention. Flat pistons are less prone to the buildup of deposits and are easier to clean than recessed pistons.

It is provided that the ratio of a volume of the prechamber to the volume of the main combustion chamber in the top dead center (the compression volume) is in the range of 1% to 5%, more in the range of 2% to 4%. The selection of a prechamber which is unusually large compared to the prior art has the effect that, despite the lean mixture in the prechamber, sufficient chemical energy is still available for the ignition pulse to ignite the main combustion chamber.

By means of an embodiment of the invention, it is achieved that even smaller gas engines (up to around one stroke volume per cylinder of approximately 3 liters), which are generally not equipped with a prechamber, can be equipped with a comparatively advantageous prechamber ignition compared to gas-flushed prechambers.

This has the effect that smaller gas engines equipped in this way achieve improved efficiency compared to the prior art. Cycle fluctuations are reduced and the internal combustion engine can be operated closer to the knock limit.

In an embodiment, the source for the gas-air mixture is designed as an intake duct of the main combustion chamber, and a connecting line is provided between the intake duct and the prechamber gas valve. The prechamber can thus be supplied with the gas-air mixture in the intake duct. An elaborate prechamber gas supply system with prechamber gas compressor, etc. is thus not required since the mixture is taken directly from the intake duct.

It is particularly preferred that the connecting line is designed as a cavity in the cylinder head and a temperature control device is provided for the connecting line. By designing the connecting line directly in the cylinder head, the line can be applied during the manufacture of the cylinder head.

Alternatively, the connecting line can be designed as a branch line which is structurally separated from the cylinder head.

The temperature control device is provided in order to keep the connecting line at a temperature that prevents condensation of the gas-air mixture.

If the connecting line is designed as a cavity in the cylinder head, engine cooling water can be used in a simple manner for pre-heating the gas-air mixture in the connecting line.

It is provided that the internal combustion engine is designed as a stationary gas engine, which is coupled or able to be coupled with a generator to generate a current.

BRIEF DESCRIPTION OF THE DRAWINGS

Embodiments of the invention are explained in more detail with reference to the figures. The figures show the following.

DETAILED DESCRIPTION

In each diagram mentioned above, the crankshaft angle.

Figure 1:
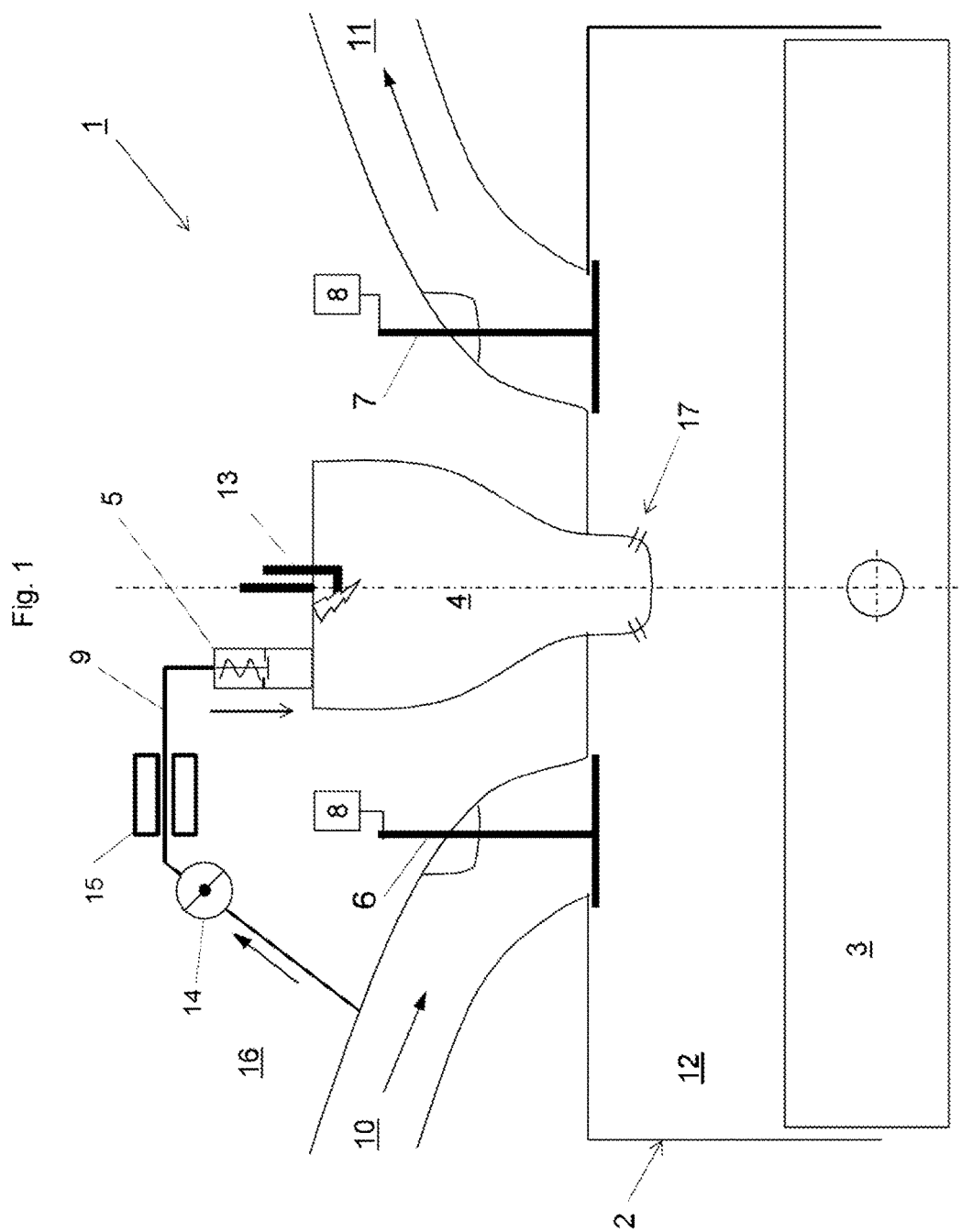
FIG. 1 A schematic representation of the parts of an internal combustion engine, FIG. 2 A graph representing a curve of pressure setting in the main combustion chamber and the charge-air pressure prevailing in the intake duct (upper diagram); Valve lift curves for different intake valve timings (middle diagram); Differential pressure between the pressure in the prechamber and the pressure in the intake duct, termed the prechamber differential pressure (lower diagram).

FIG. 1 shows a cylinder 2 in which a piston 3 is arranged so as to be movable up and down, whereby a main combustion chamber 12 is formed between the piston 3 and the cylinder 2. At its top dead center, the piston 3 with the cylinder 2 forms the so-called compression volume.

An intake duct 10 can be closed by an intake valve 6 and an outlet duct 11 can be closed by an outlet valve 7 opposite the main combustion chamber 12.

A prechamber 4 communicates with the main combustion chamber 12 via overflow holes 17 and has an ignition source 13 and a prechamber gas valve 5 in the form of a non-return valve, which is connected to a source for a gas-air mixture. In this exemplary embodiment, the intake duct 11 itself serves as this source, and a connecting line 9, which is formed as a cavity in the cylinder head 15, is provided for the prechamber gas valve 5. To regulate the quantity of gas-air mixture that can be fed into the prechamber 4, an adjustable throttle is arranged in the connecting line 9 in this exemplary embodiment.

Furthermore, a temperature control device 15 is provided in the form of pre-heating by means of engine cooling water in order to keep the connecting line 9 at a temperature that prevents condensation of the gas-air mixture.

Figure 2:
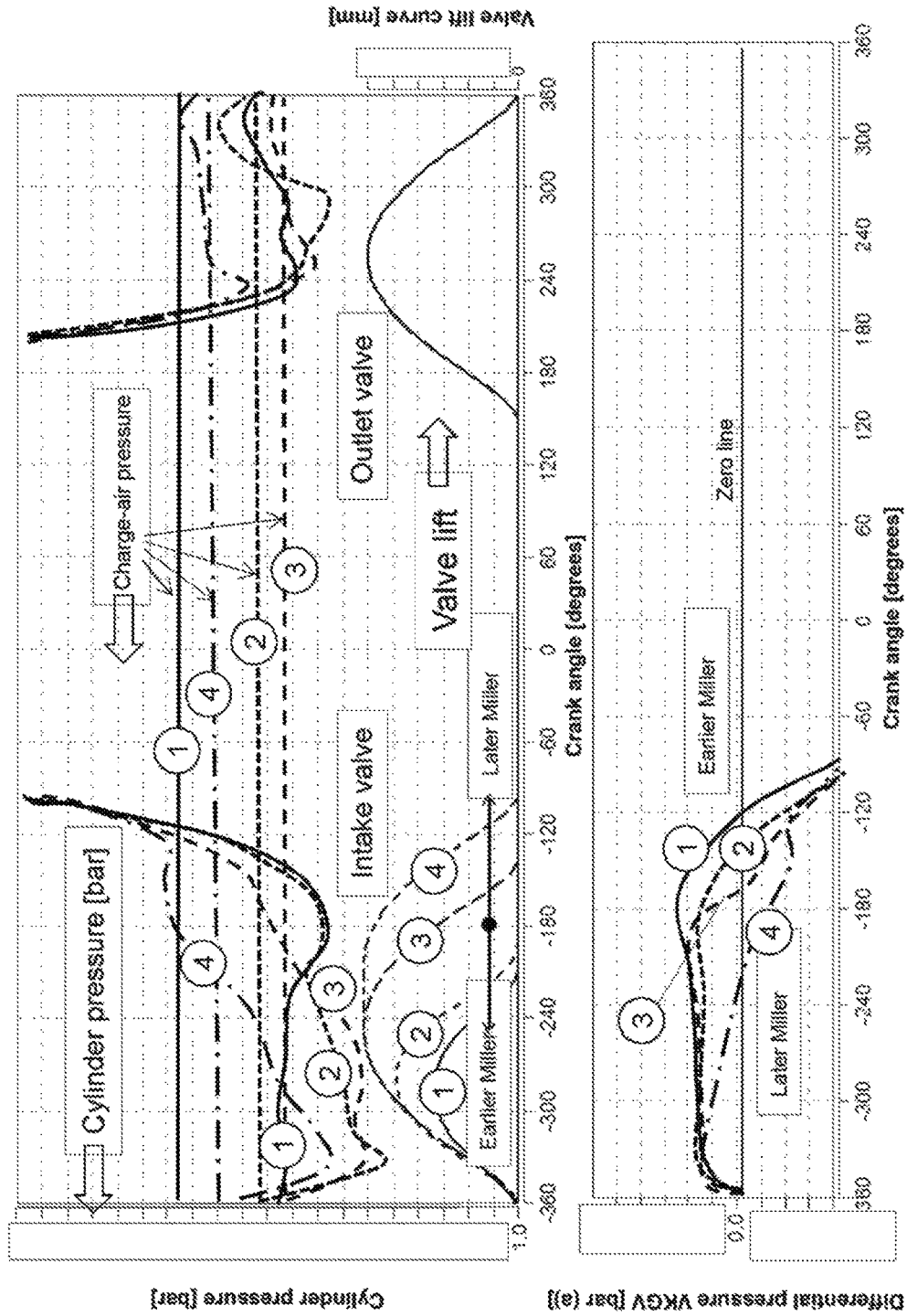

FIG. 2 shows the cylinder pressure curve for different intake valve timings in the upper part of the diagram.

The valve lift curves of the intake and outlet valves are shown below for different intake valve timings.

The diagram below shows the curve of the differential pressure across the prechamber gas valve over the crank angle.

The series of curves are distinguished as follows:

Curves "1" denote the pressure curves for the earliest intake valve closing ("early Miller")

Curves "2" denote the pressure curves for a later intake valve closing than curves "1"

Curves "3" denote the pressure curves for a later intake valve closing than curves "2". This is the filling-optimized valve lift curve, characterized by the lowest charge-air pressure to be applied at the same engine power.

Curves "4" denote the pressure curves for a later intake valve closing than curves "3" ("late Miller").

The different intake valve lift curves 1 to 4 are shown in mm in the valve lift curves. The sequence is 1, 2, 3, 4.

The charge-air pressure is adapted to the intake valve timings. The adapted charge-air pressures are represented as charge-air pressures 1 to 4, of which the highest charge-air pressure is applied to the valve timings "1". This is followed by the second highest charge-air pressure for the valve timings "4". The next highest charge-air pressure is applied to the valve timings "2". The lowest charge-air pressure is applied to the valve timings "3". The sequence of the charge-air pressures from high to low is therefore 1, 4, 2, 3.

The resulting cylinder pressure curves are again marked with the numbers 1 to 4.

In the diagram below, the curves of the differential pressure between the charge-air pressure (i.e. the pressure in the intake duct 10) and the pressure in the prechamber 4 over the crank angle for the different valve timings 1 to 4 are shown and marked with the numbers 1 to 4.

A positive differential pressure (above the zero line) means that the pressure in the intake duct 10 (charge-air pressure) is higher than the pressure in the prechamber 4, and thus the gas-air mixture can flow from the intake duct via the prechamber gas valve into the prechamber. The differential pressure must, of course, still exceed the spring force of the prechamber gas valve 5 which is designed as a non-return valve, and must be higher than zero accordingly.

The area under the differential pressure curve (between the differential pressure curve and the zero line) is proportional to the quantity of the gas-air mixture streamed into the prechamber 4 in one working cycle.

It can be seen that, with early intake valve closing times ("early Miller"), significantly more gas-air mixture flows into the prechamber 4 than with the late intake valve closing times ("late Miller") that are usual for internal combustion engines of this type.

This ensures that, even with the use of a lean gas-air mixture from the intake duct 10 of the internal combustion engine 1, the same chemical energy can be introduced into the prechamber 4 as is otherwise possible only with the use of a rich gas-air mixture for flushing the prechamber (i.e. with a gas-flushed prechamber).

In addition, residual gas is flushed from the prechamber effectively before the next combustion cycle.

In the connecting duct 9, an adjustable throttle may be provided in one variant, via which the supplied quantity can be regulated and reduced if necessary.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An internal combustion engine comprising:
a cylinder head and at least one piston-cylinder unit;

a cylinder in the at least one piston-cylinder unit;
a flat piston in the at least one piston-cylinder unit moveable between a bottom dead center position and a top dead center position;
a main combustion chamber arranged in the cylinder between the piston and the cylinder head communicating with a prechamber having a prechamber gas valve;
an actuator operable to actuate an intake valve and an outlet valve of the main combustion chamber such that the intake valve closes before the piston reaches the bottom dead center position; and
an intake duct of the main combustion chamber is a source for a gas-air mixture for the prechamber gas valve connected via a connecting line, being a cavity in the cylinder head, provided between the intake duct and the prechamber gas valve;
wherein a prechamber charge from the prechamber gas valve consists of the gas-air mixture with a lambda higher than 1.2.

2. The internal combustion engine according to claim 1, wherein a ratio of a volume of the prechamber to a compression volume of the main combustion chamber is in a range of 1% to 5%.

3. The internal combustion engine according to claim 1, further comprising a temperature control device provided for the connecting line, operable to keep the connecting line at a temperature preventing condensation of the gas-air mixture.

4. The internal combustion engine according to claim 1, wherein the internal combustion engine is a stationary gas engine coupled to a generator to generate a current.

5. The internal combustion engine according to claim 1, wherein the prechamber charge is the gas-air mixture with the lambda higher than 1.5.

6. The internal combustion engine according to claim 1, wherein the prechamber charge is the gas-air mixture with the lambda higher than 1.7.

7. The internal combustion engine according to claim 1, wherein a ratio of a volume of the prechamber to a compression volume of the main combustion chamber is in a range of 2% to 4%.

8. A method of operating an internal combustion engine comprising:
providing an internal combustion engine with a prechamber and a main combustion chamber with a flat piston;
charging via a connecting line being a cavity in a cylinder head, arranged between an intake duct of the main combustion chamber and a prechamber gas valve, the prechamber with a gas-air mixture from the prechamber gas valve with a lambda higher than 1.2; and
operating an intake valve of the main combustion chamber connected to the prechamber, in an early Miller cycle.

9. The method according to claim 8, wherein charging the prechamber is with the gas-air mixture with the lambda higher than 1.5.

10. The method according to claim 8, wherein charging the prechamber is with the gas-air mixture with the lambda higher than 1.7.

* * * * *